United States Patent
Rong et al.

(10) Patent No.: US 10,917,460 B2
(45) Date of Patent: Feb. 9, 2021

(54) DISTRIBUTED LOAD-BALANCING FOR SOFTWARE DEFINED NETWORKS

(71) Applicant: International Business Machines Corporation, Armonk, NY (US)

(72) Inventors: Liang Rong, Jiangsu (CN); Gang Tang, Nanjing (CN); Zi Jin Tao, Jiangsu Province (CN); Ming Shuang Xian, Wuxi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/361,480

(22) Filed: Mar. 22, 2019

(65) Prior Publication Data
US 2019/0222639 A1    Jul. 18, 2019

Related U.S. Application Data

(63) Continuation of application No. 15/401,196, filed on Jan. 9, 2017, now Pat. No. 10,305,973.

(51) Int. Cl.
| | |
|---|---|
| H04L 12/00 | (2006.01) |
| H04L 29/08 | (2006.01) |
| H04L 12/721 | (2013.01) |
| H04L 12/741 | (2013.01) |
| H04L 29/06 | (2006.01) |
| H04L 12/803 | (2013.01) |

(52) U.S. Cl.
CPC .......... *H04L 67/1004* (2013.01); *H04L 45/72* (2013.01); *H04L 45/745* (2013.01); *H04L 47/125* (2013.01); *H04L 67/1031* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,416,692 B2 | 4/2013 | Patel | |
| 2010/0036903 A1* | 2/2010 | Ahmad | G06F 9/505 709/202 |

(Continued)

OTHER PUBLICATIONS

List All IBM Related Applications, Appendix P, 2019.
(Continued)

*Primary Examiner* — Noel R Beharry
*Assistant Examiner* — Lionel Preval
(74) *Attorney, Agent, or Firm* — Garg Law Firm, PLLC; Rakesh Garg; Scott Dobson

(57) ABSTRACT

A load-balancer instance is instantiated in a network virtualization edge (NVE) in a software defined network (SDN). A forwarding table in the NVE is modified to indicate that a next hop for a packet having a destination address of the load-balancer instance is to be resolved by the load-balancer instance. From a portion of the packet, and using the load-balancer instance, a value usable to select a singular next hop to a first real server in a pool of real servers managed by the load-balancer instance is determined. The packet is forwarded, using the modified forwarding table, the packet through an underlay of the SDN such that the packet tunnels from the NVE to a first NVE, the second NVE hosting the first real server.

20 Claims, 10 Drawing Sheets

| STATE | FORWARDING METHOD |
|---|---|
| NORMAL | USE LBIT |
| PRE | USE LBIT AND UPDATE ST |
| CHG | USE BOTH LBIT AND ST |

(56) References Cited

U.S. PATENT DOCUMENTS

| | | |
|---|---|---|
| 2015/0068118 A1 | 3/2015 | Stewart |
| 2015/0124805 A1* | 5/2015 | Yadav .................... H04L 47/50 370/389 |
| 2015/0163152 A1 | 6/2015 | Li |
| 2015/0215236 A1 | 7/2015 | Joshi |
| 2016/0080505 A1* | 3/2016 | Sahin ................ H04L 67/1027 709/229 |
| 2016/0285769 A1 | 9/2016 | Qiang |
| 2017/0324809 A1 | 11/2017 | Patil |
| 2018/0139175 A1* | 5/2018 | Parvanov ............ H04L 63/0209 |

OTHER PUBLICATIONS

Retana et al; Nvo3 Status Pages, https://tools.ietf.org/wg/nvo3, May 1, 2012.
Wikipedia; TCP tuning, https://en.wikipedia.org/wiki/TCP_tuning, Jan. 3, 2017.

\* cited by examiner (PRIOR-ART)

*FIGURE 7*

| LB ID 702 | VALID 704 | VNID | VIP 706 | NEXT HOP 708 |
|---|---|---|---|---|
| 1 | TRUE | 1001 | 120.1.1.2 | NEXT HOP1 |
| 1 | TRUE | 1001 | 120.1.1.2 | NEXT HOP2 |
| 1 | TRUE | 1001 | 120.1.1.2 | NEXT HOP3 |
| 2 | TRUE | 1002 | 120.1.2.2 | NEXT HOP4 |
| 2 | TRUE | 1002 | 120.1.2.2 | NEXT HOP5 |
| ...... | ...... | ...... | ...... | ...... |

| LB ID | SOURCE IP | SOURCE PORT | VIP IP | DESTINATION PORT | AGE 802 | NEXT HOP |
|---|---|---|---|---|---|---|
| 1 | 120.1.1.10 | 1001 | 120.1.1.2 | 80 | FALSE | NEXT HOP1 |
| 1 | 120.1.1.11 | 1002 | 120.1.1.2 | 80 | FALSE | NEXT HOP2 |
| 1 | 120.1.1.12 | 1003 | 120.1.1.2 | 80 | FALSE | NEXT HOP3 |
| ……… | ……… | ……… | ……… | ……… | FALSE | ……… |

800

DISTRIBUTED LOAD-BALANCING FOR SOFTWARE DEFINED NETWORKS

TECHNICAL FIELD

The present invention relates generally to a method, system, and computer program product for optimally distributing client requests in a software defined network (SDN). More particularly, the present invention relates to a method, system, and computer program product for distributed load-balancing for an SDN.

BACKGROUND

A data processing environment comprises a variety of hardware, software, and firmware networking components. A physical network, also called a data plane or an underlay, is a network of physical components where an actual networking operations are performed and computational workloads are executed.

Techniques are available presently to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. In other words, an SDN is a logical network formed and operated using logical representations of the underlying physical components.

Physical networks usually exist within the demarcated boundary of the data processing environment whose physical components are utilized in the physical network. Unlike a physical network, an SDN can be designed to span across one or more data processing environment. For example, while a physical network may be contained within a datacenter, an SDN may span across one or more datacenters.

As an example, a logical representation of a hypervisor can participate in an SDN, such that a function attributed to the logical representation of the hypervisor in the SDN is actually performed by the underlying hypervisor component in the underlay. Similarly, a logical representation of a switch or a networking gateway can participate in an SDN, such that a function attributed to the logical representation of the switch or the networking gateway in the SDN is actually performed by the underlying switch or the networking gateway component, respectively, in the underlay.

A physical computing machine can be represented and used in an SDN as a virtual device, which is also referred to as a Network Virtualization Edge (NVE) in an SDN. An application configured to execute on an edge essentially is executed on the underlying physical computing machine in a similar manner.

In an SDN, because the actual physical networking components that perform the networking functions are abstracted into logical entities representing the networking functionality offered by those components and not the actual implementations of those functionalities, something is needed to direct those networking functionalities into a functioning logical network. An SDN controller is a component that manages and operates the logical networking components within an SDN.

Henceforth in this disclosure, any reference to a component within the context of an SDN is a reference to a logical representation of the component, which participates in the SDN, unless expressly distinguished where the reference is made. For example, a reference to a hypervisor in communication with an SDN controller is a reference to a logical representation of the hypervisor that operates in the SDN managed by the SDN controller and not to the hypervisor component of a machine that actually performs a task in the physical network. Similarly, as another example, a reference to a function performed by an application on an edge, or a reference to a function caused to occur on such an application by the SDN controller, is a reference to the function performed by the execution of the application on the underlying physical computing machine.

A variety of SDNs is presently configurable, each with independent service models, topologies, and addressing architectures, over the same physical network. Overlay network methodology is an extensively used model to fulfill such network virtualization. Internet Engineering Task Force (IETF) has a Network Virtualization Overlays (NVO3) work group, which has proposed several overlay protocols, for example, VXLAN, NVGRE, and STT, to achieve network virtualization. These standards and protocols have been extensively adopted by many networking vendors, switch manufacturers, and cloud service providers.

Any reference herein to an NVO3 network is not intended to limit the scope of the illustrative embodiments to a particular specification, standard, or protocol produced by the IETF NVO3 work group, but is intended as a non-limiting example in which an embodiment can be practiced. An embodiment described herein is generally usable with an SDN that may or may not conform to a product of IETF NVO3. From this disclosure, those of ordinary skill in the art will be able to adapt an embodiment to other types of SDNs, and such adaptations are contemplated within the scope of the illustrative embodiments.

Data processing environments often provide multiple resources, such as servers, to handle certain workloads. For example, a popular website or service is often supported by multiple web servers so that requests for the site or service from numerous browsers can be handled efficiently and without unacceptable delays.

The technique for distributing competing or similar workloads across a pool of similar or analogous resources is called load balancing. A load balancer is an application or a component that implements load balancing for a given pool of resources. Data processing systems and applications are some examples of resources, whose multiple instances can be pooled and managed by a load balancer. Requests, data transmissions, and job submissions directed towards such data processing systems or application instances are some examples of workloads that a load balancer can direct or manage for the resource pool.

Many different types of algorithms are presently available for load balancing. A load balancer executes a load balancing algorithm to select an instance of a pooled resource to which a given workload should be directed.

Load balancers are useful in an SDN as well. For example, a client—which is typically a virtual machine (VM) executing an application or workload on an edge in the SDN—sends a request packet to a server application. The server application may be supported by a pool of load-balanced servers (real servers) operating in the underlay. A load-balancer is usable for routing the packet from the VM in the SDN to a real server in the pool.

SUMMARY

The illustrative embodiments provide a method, system, and computer program product. An embodiment includes a method that instantiates a load-balancer instance in a network virtualization edge (NVE) in a software defined network (SDN). The embodiment modifies a forwarding table in the NVE to indicate that a next hop for a packet having a destination address of the load-balancer instance is to be resolved by the load-balancer instance. The embodiment determines, from a portion of the packet, and using the load-balancer instance, a value usable to select a singular next hop to a first real server in a pool of real servers managed by the load-balancer instance. The embodiment forwards the packet, using the modified forwarding table, through an underlay of the SDN such that the packet tunnels from the NVE to a first NVE, the second NVE hosting the first real server.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a load-balancer instance table in accordance with an illustrative embodiment;

FIG. 8 depicts a session table in accordance with an illustrative embodiment;

DETAILED DESCRIPTION

Figure 1:
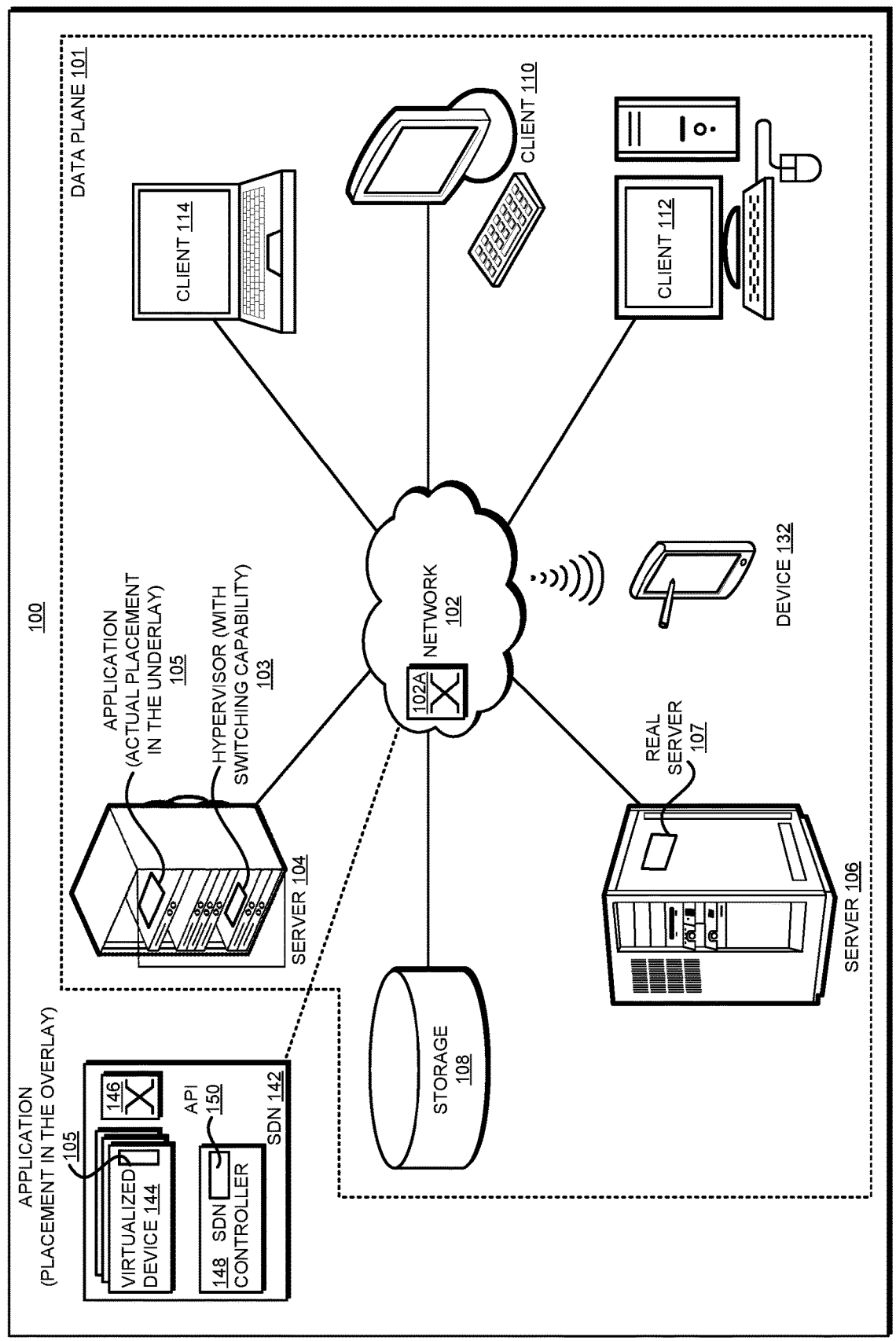
FIG. 1 depicts a block diagram of a network of data processing systems in which illustrative embodiments may be implemented.

Consider an example data processing environment, where an NVE receives packet traffic from a VM and tunnels the packets to a destination NVE through the underlay network. The tunneling technology can be based on any overlay protocols, e.g., VXLAN, NVGRE, STT as mentioned herein. The destination NVE decapsulates a tunneled packet—i.e., recovers the packet from the encapsulation— and forwards the decapsulated packet to the correct destination VM. The destination VM then processes the packet using a real server.

Presently, a load balancer is placed ahead of several real servers to provide scalability and/or reliability of services. The load balancer, situated between clients and the real servers, distributes the request packets from the clients among these real servers to achieve a balanced traffic load, to maximize the performance and service availability, as well as to achieve a high level of reliability.

However, the illustrative embodiments recognize that using a traditional load balancer in this manner in an SDN has some drawbacks. For example, SDN architectures such as NVO3 expect using the virtualized network devices to provide adequate programmable flexibility. However, presently used software implemented virtualized load balancer has certain performance restrictions, which leaves gaps in meeting the performance needs in large-scale distributed application scenarios.

As another example, the traditional way in which load balancers—no matter hardware based or software based— run on overlay network prolong the physical transmission pipes and increase the end-to-end delay. Presently, to use a load-balancer with an SDN, the NVE closest to the client encapsulates the packet and sends to the underlay. The underlay sends the encapsulated packet to an intermediate NVE where the load-balancer is operating. The intermediate NVE decapsulates the packet to allow the load-balancer to use the packet in load-balancing. The intermediate NVE encapsulates the packet for the destination NVE where the real server selected by the load-balancer exists. The destination decapsulates the packet to allow the real server to service the request in the packet.

Thus, the client requests must first traverse the underlay network to reach the load balancer, and next the load balancer returns the client requests to the underlay network and the packet must traverse the underlay again to reach the selected destination server. This multiple traversal causes the deployment of load balancers in overlay networks sub-optimal in terms of transmission efficiency for introducing prolonged transmission delays.

The illustrative embodiments recognize that the presently available tools or solutions do not address these needs or provide adequate solutions for these needs. The illustrative embodiments used to describe the invention generally address and solve the above-described problems and other problems related to distributed load-balancing for an SDN.

An embodiment can be implemented as a software application. The application implementing an embodiment can be configured as a modification of an existing SDN controller, as a separate application that operates in an NVE in conjunction with an existing SDN controller, a standalone application in an NVE, or some combination thereof.

The illustrative embodiments provide a method to implement a load-balancer in a distributed manner in an NVE. An embodiment instantiates a load-balancer in an NVE. The embodiment publishes the location information of each real server participating in a load-balanced pool, to the load-balancer in the NVE. A new real server can be added to the pool and deleted from the pool. Additional instances of the load-balancer can be created and a load-balancer instance can be deleted from the NVE as described herein.

When the NVE receives a request packet from a client associated with that NVE, an embodiment in the NVE enables the load-balancer in the NVE to select one of the real servers from the pool of servers. In one embodiment, the destination real server is selected according to a hashing scheme, while maintaining any existing affinity and server and flow states. For example, the hash of a portion of a packet, such as a packet header or header fields, is mapped to a certain real server address. Different request packets from different clients or sessions can thus be directed to different real servers, while consistently sending the requests from the same client or session to the same real server as much as possible.

The service request initiated from a client can generally be directed to a real server in this manner by an VE that is closest to client VM. No external load-balancer has to be implemented, as in the prior art, reducing the total cost of ownership as well as potential points of failure. In some embodiments, the load balancing function can be blended in with the normal NVE forwarding operation, such as in the switching operation of the hypervisor abstraction.

The manner of distributed load-balancing for an SDN described herein is unavailable in the presently available methods. A method of an embodiment described herein, when implemented to execute on a device or data processing system, comprises substantial advancement of the functionality of that device or data processing system in reducing or eliminating the need for the extra computing resources to serve the load balancing function. Furthermore, because separate load balancer devices are no longer needed in the described configuration, the illustrative embodiments reduce or eliminate the performance restriction introduced by the prior-art virtualized load-balancer. As a result, the end-to-end transmission delay is also greatly reduced by using an embodiment. The illustrative embodiments also improve the performance of transmission control protocol (TCP) applications by reducing the transmission delays of the prior-art, because TCP performance is inversely proportional to RTT (Round Trip Time). Lower RTT of the llustrative embodiments, as compared to that of the prior-art method of load-balancing in SDNs, contributes to better TCP performance of applications in the SDNs.

The illustrative embodiments are described with respect to certain types of SDNs, NVEs, clients, requests, packets, load balancers, real servers, addresses, tables, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
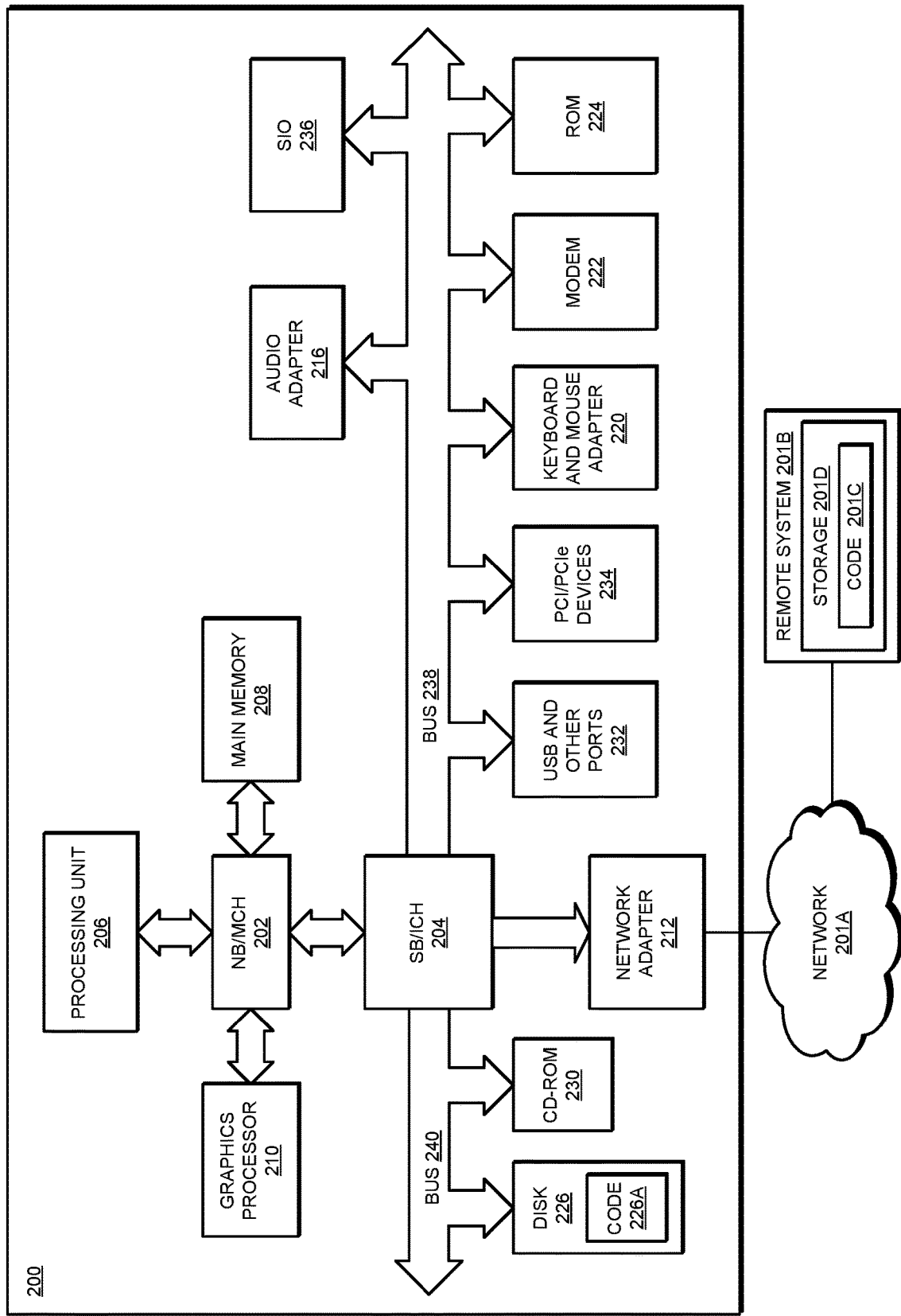
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 and the resources connected thereto forms data plane 101 over which SDN 142 is overlaid. Data plane 101 includes data processing system components, such as hypervisor 103, and physical networking components, such as switch 102A. SDN 142 implements virtual representations of one or more computing machines, such as virtualized device 144 which uses all or a portion of underlying server 104. Virtualized device 144 is an NVE as described herein. SDN 142 implements virtual representations of a networking components, such as switch 146, which is a virtualized representation of physical switch 102A. SDN 142 operates SDN controller 146 for one tenant's NVE. SDN controller 146 implements a set of application programming interface (API) 150, which is usable for instantiating a load-balancer in SDN 142, deleting a load-balancer instance in SDN 142, adding a real server to a load-balanced pool of a load-balancer instance, and deleting a real server from the load-balanced pool of the load-balancer instance. Application 105 implements an embodiment described herein. Particularly, application 105 configured to operate in edge 144 is actually executed as application 105 on server 104 in data plane 101. A packet is received in the tenant's NVE, which includes edge 144. Application 105 in edge 144 causes the load-balancing to occur in the NVE as described herein, and the packet is transmitted to selected real server in a computing machine, such as to real server 107 in server 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in whichH the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
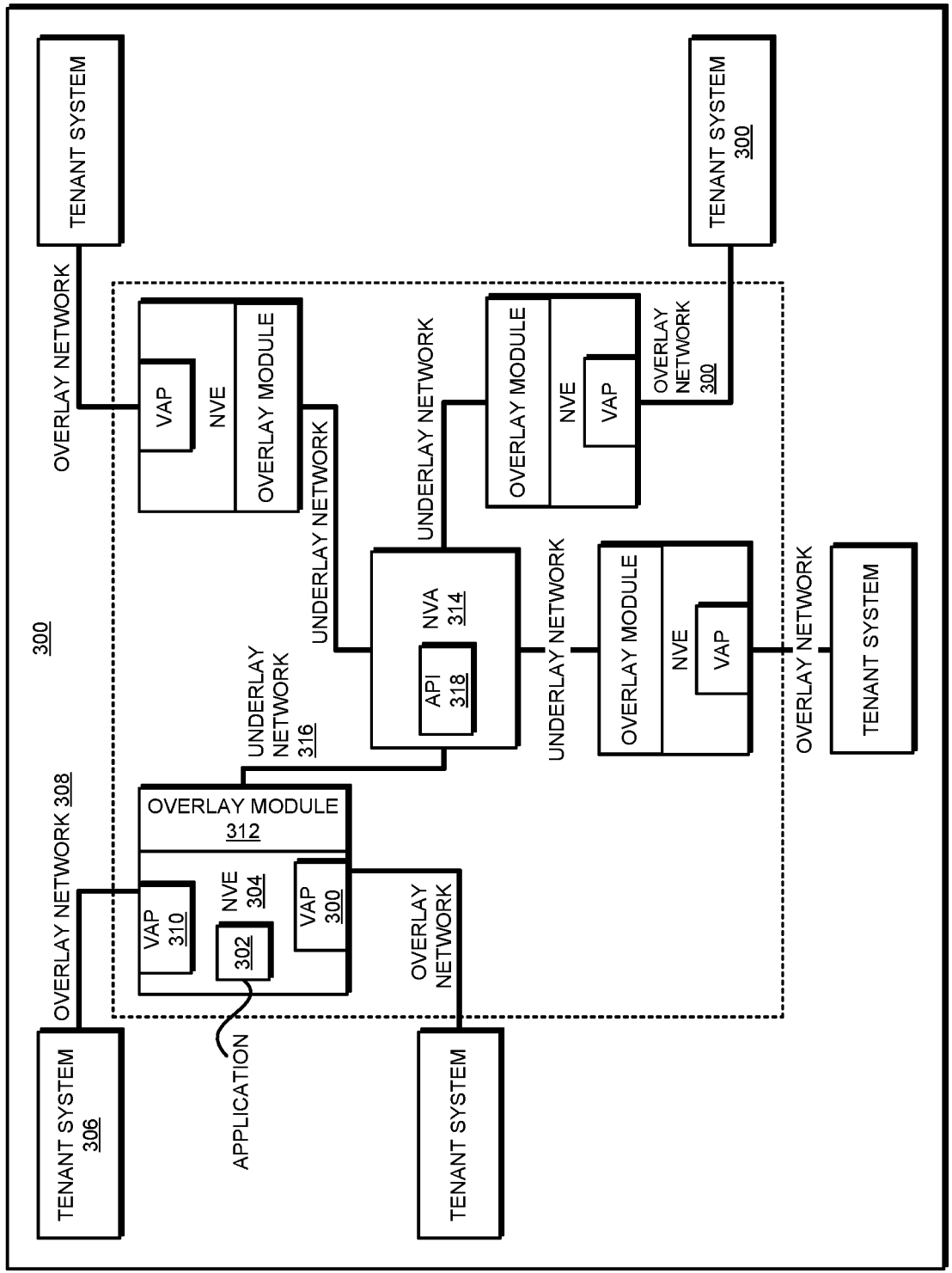
FIG. 3 depicts a block diagram of an example NVO3 architecture framework in which distributed load-balancing for an SDN can be performed in accordance with an illustrative embodiment.

With reference to FIG. 3, this figure depicts a block diagram of an example NVO3 architecture framework in which distributed load-balancing for an SDN can be performed in accordance with an illustrative embodiment. Application 302 is an example of application 105 in edge 144 in FIG. 1. NVE 304 is an example of NVE 144 in FIG. 1. Tenant system 306 may be a VM that sends a request packet over overlay network 308 to NVE 304 via virtual access point (VAP) 310. Other tenant systems, such as other VMs in the tenant's environment, may interact with NVE 304 in a similar manner.

Overlay module 312 interacts with Network Virtualization authority (NVA) 314 using underlay network 316. NVA 314 is an example of SDN controller 148 and facilitates the interoperations between the overlay devices and the underlay devices. According to one embodiment, NVA 314 implements one or more APIs 318, which are similar to API 150 in FIG. 1. APIs 318 facilitate operations of application 302 for adding or deleting a load-balancer in NVE 304, adding or deleting a real server to a load-balancer in NVE 304, or some combination thereof. In one embodiment, application 302 includes the load-balancer instance and the related structure, as described herein.

Figure 4:
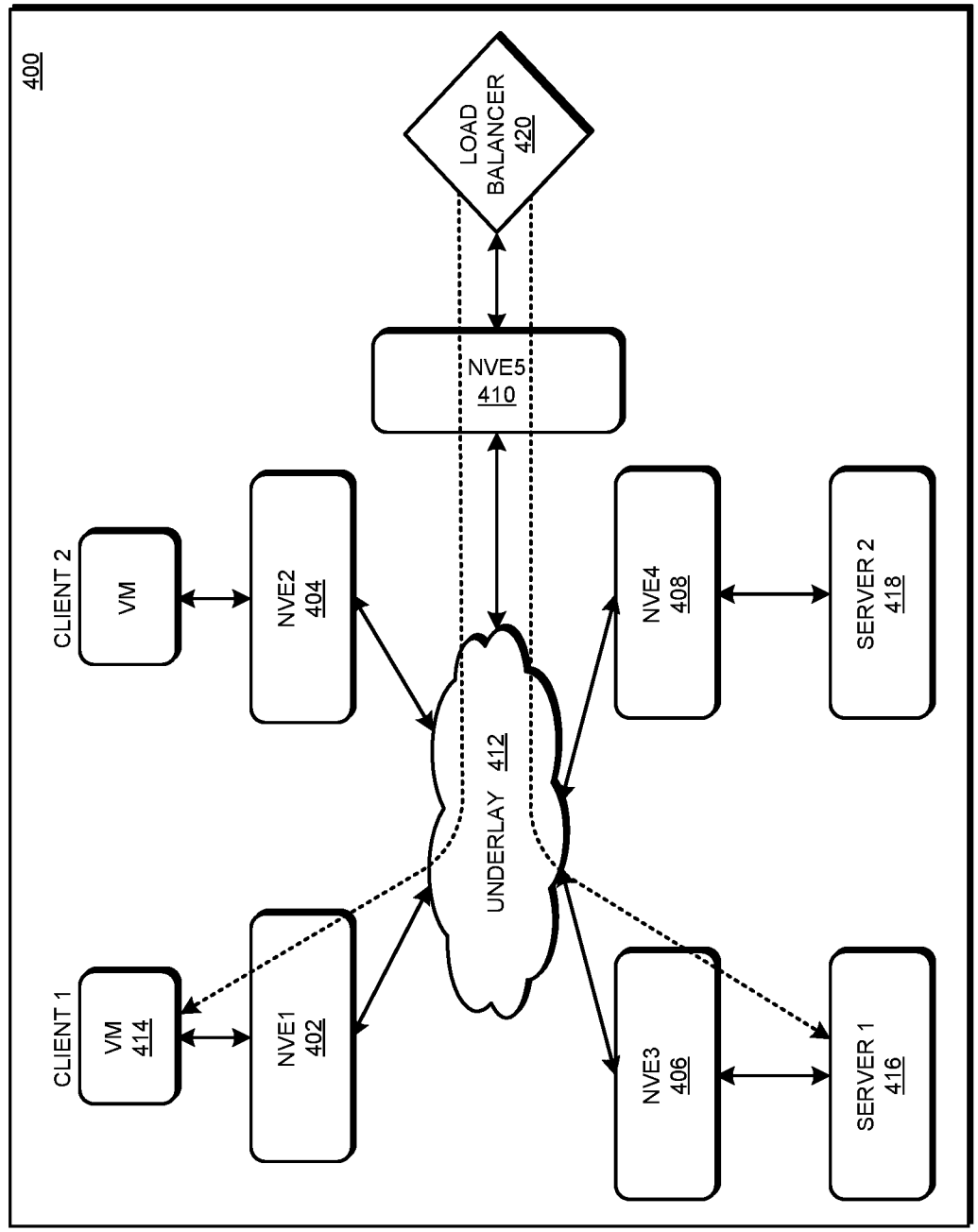
FIG. 4 depicts a block diagram of a prior-art method of using a load balancer with an SDN, which can be improved by using an illustrative embodiment.

With reference to FIG. 4, this figure depicts a block diagram of a prior-art method of using a load balancer with an SDN, which can be improved by using an illustrative embodiment. NVE1 402, NVE2 404, NVE3 406, NVE4 408, and NVE5 410 are NVEs as depicted in FIG. 3. NVEs 402-410 communicate with each other using underlay 412, as described herein.

Suppose that VM 414 is an example of tenant system 306 in FIG. 3, and server1 416 and server2 418 are two pooled real servers that provide some service that VM 414 can request. Load-balancer is available at NVE5 410 and manages the pool of server1 416 and server2 418.

Presently, when VM 414 has a request for the service, VM 414 sends a packet to NVE1 402. NVE1 402 encapsulates the packet and sends to NVE5 410. NVE5 410 decapsulates the packet and sends to load-balancer 420. Load-balancer selects a real server, say, server1 416 to service the request of the packet.

NVE5 410 encapsulates the packet again and sends to NVE3 406 which is hosting server1 416. NVE 406 decapsulates the packet and sends to server1 416 for processing. This manner of load-balancing in an SDN requires numerous encapsulations and decapsulations, and creates an unnecessarily long tunnel through the underlay, which contributes to the disadvantages described herein.

Figure 5:
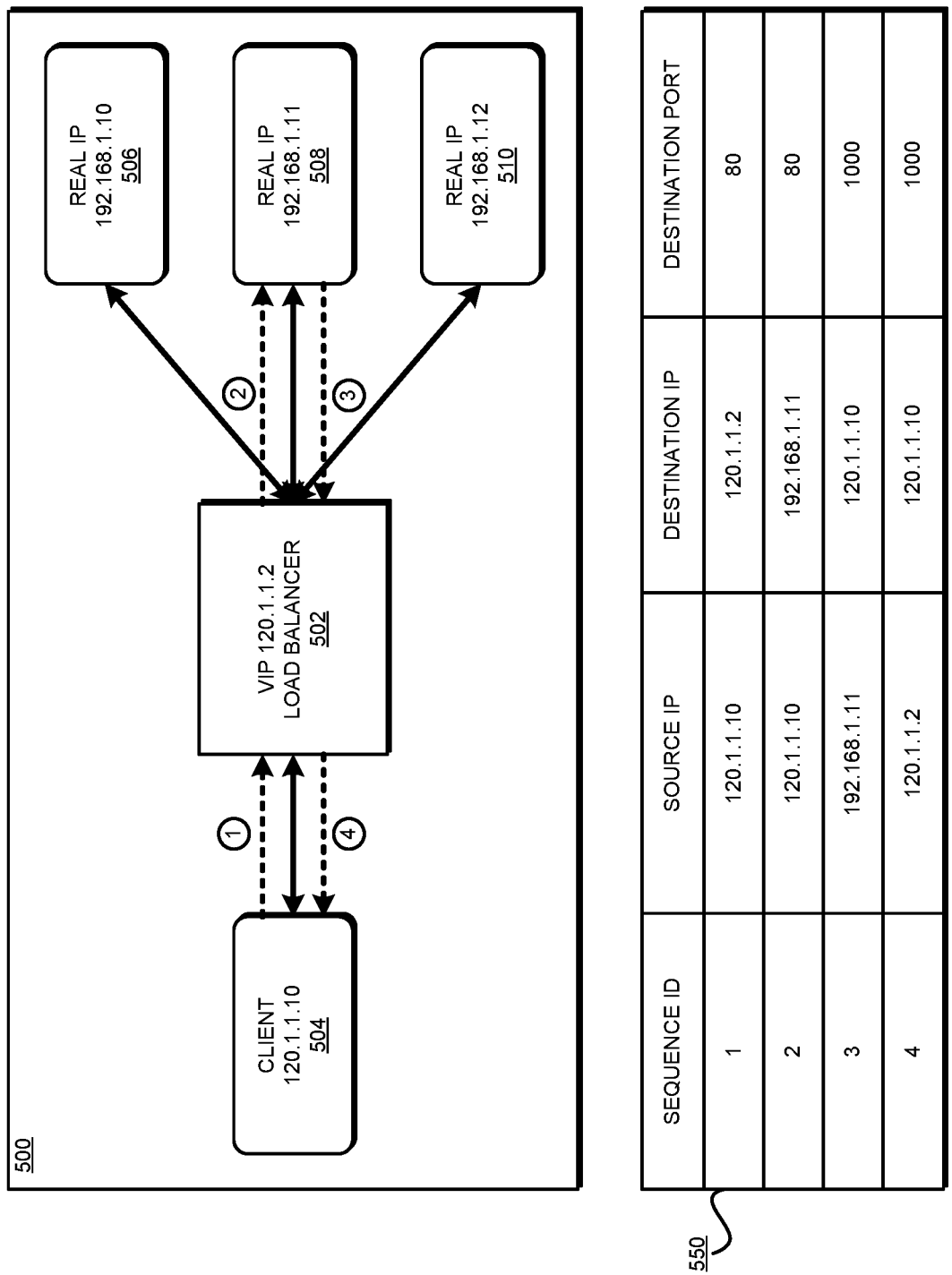
FIG. 5 depicts a block diagram of an example operation of a load-balancer in an SDN in accordance with an illustrative embodiment.

With reference to FIG. 5, this figure depicts a block diagram of an example operation of a load-balancer in an SDN in accordance with an illustrative embodiment. Load-balancer 502 in block diagram 500 is instantiated in, or by, application 302 in FIG. 3, in NVE 304 in FIG. 3. In the block diagram of FIG. 4, load-balancer 502 can be regarded as being present in NVE1 402. Accordingly, client 504 is an example of tenant system 306 in FIG. 3, or VM 414 in FIG. 4. Real servers 506, 508, and 510 are members of a pool load-balanced by load-balancer 502. Each of real servers 506, 508, and 510 is an example of real servers 416 or 418 in FIG. 4.

Generally, load-balancer 502 is configured with a virtual IP (VIP), that is assigned for external access. The VIP is owned by the NVE. Stated another way, the VIP of load-balancer 502 is valid only within the NVE in which load-balancer 502 is created, is unique within that NVE, and is usable only by entities communicating with the NVE such as client 504.

Through the VIP, client 504 can access application resources behind the load balancer, such as those provided from a real server 506-510. When load balancer 502 receives a packet in which the destination IP address is the VIP of load-balancer 502, load-balancer 502 selects one real server from real servers 506-510 to serve client 504's request according to some traffic load distribution algorithm.

Load-balancer 502 changes the destination IP address of the packet to the selected real server, e.g., real server 506. When the selected real server receives one or more request packets in this manner, the selected real server echoes one or more reply packets to client 504. The return path of the reply packets can be different depending on the different load-balancer implementations. For example, in the Network Address Translation (NAT) mode, the reply packets will pass through load-balancer 502, and load-balancer 502 changes a reply packet's source IP address to VIP. In a different implementation of load-balancer 502, such as in a Direct reply (DR) mode (not shown), the reply packet will not pass through load-balancer 502, and will be forwarded directly to client VM 504. The illustrative embodiments are not dependent upon any specific manner of implementing load-balancer 502. From this disclosure, those of ordinary skill in the art will be able to adapt the operations and functions described herein according to the load-balancer of choice, and such adaptations are contemplated within the scope of the illustrative embodiments.

Block diagram 500 and table 550 show the packet flow in a non-limiting example NAT mode. In packet flow sequence ID 1, table 550 shows that the request packet has a source address of client 504 and a destination address as the VIP of load-balancer 502. In sequence ID 2, load-balancer 502 changes the destination address to the actual address of a selected real server, e.g., of real server 508. Thus, the packet is sent to real server 508 for processing.

In sequence ID 3, load-balancer 502 receives a reply packet with source address of real server 508 and the destination address of client 504. In sequence ID 4, load-balancer 502 changes the source address to the VIP of load-balancer 502. The reply packet is then sent to client 504 as if the reply packet originated from load-balancer 502.

Figure 6:
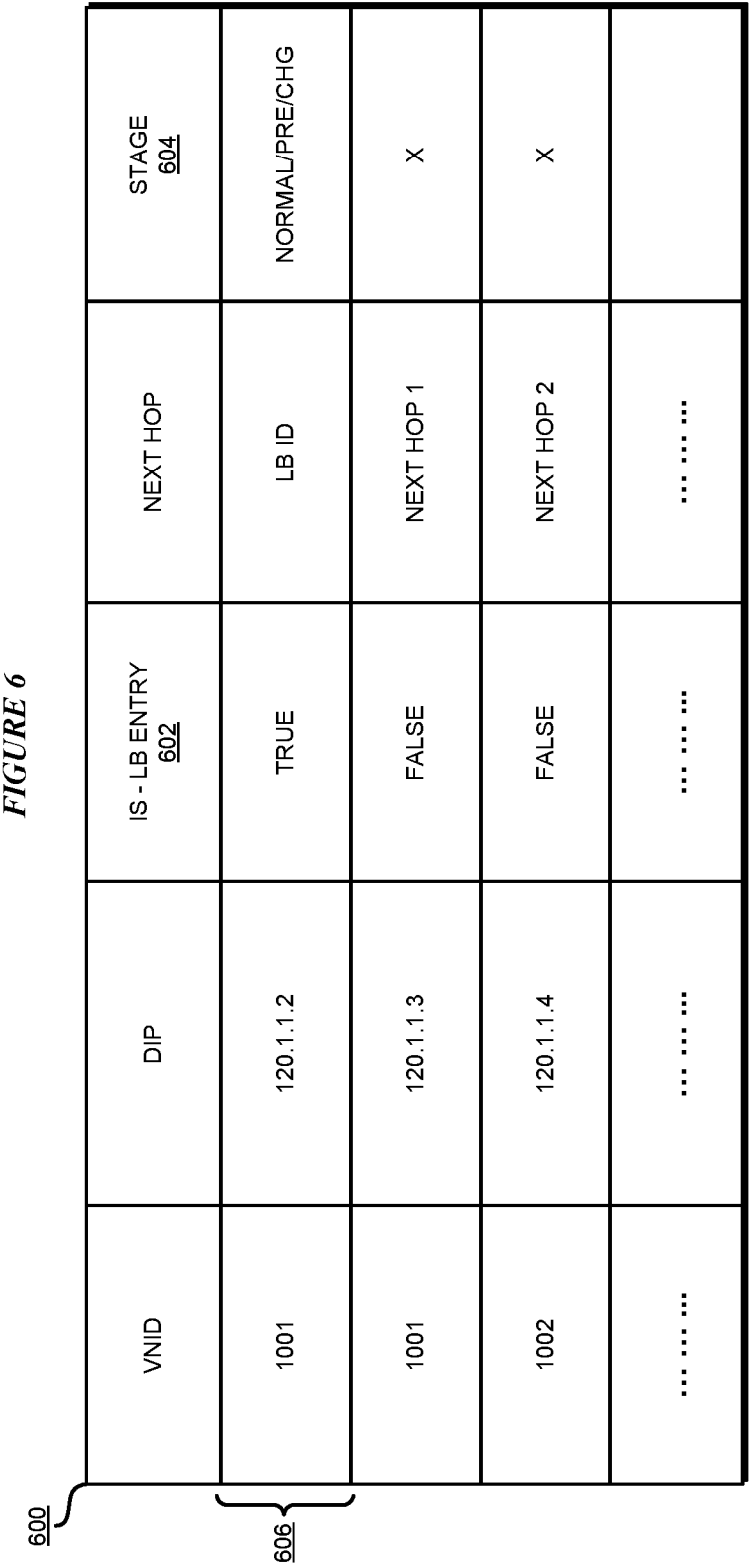
FIG. 6 depicts a modified forwarding table of an NVE for distributed load-balancing for an SDN in accordance with an illustrative embodiment.

With reference to FIG. 6, this figure depicts a modified forwarding table of an NVE for distributed load-balancing for an SDN in accordance with an illustrative embodiment. Table 600 can be implemented in NVE 304 in FIG. 3.

Presently, an NVE maintains a forwarding table which simply provides the next hop information for a destination address (DIP). In order to implement a distributed load-balancer in the NVE, the NVE must now know whether the DIP is the VIP of the load-balancer. Accordingly, column 602 or a suitable equivalent thereof is added or associated with the existing forwarding table to form a modified forwarding table 600.

Column 604 is also a new column that is added or associated with the existing forwarding table of the NVE. The function of column 604 will become clear from the description of the subsequent figures.

A DIP has a Boolean True/False value in column 502, indicating whether the DIP is the VIP of a load-balancer. If for a DIP the value in column 602 is False, the packet forwarding occurs as it presently does. When the value in column 602 for a DIP is True, the NVE has to perform some additional operations for forwarding the packet.

Entry 606 is an example of an entry with a True value in column 602. An entry with a True value in column 602 is added by an embodiment, such as by application 302 in FIG. 3, when a new instance of a load-balancer is created in the NVE.

FIG. 7 depicts a load-balancer instance table in accordance with an illustrative embodiment. When the new instance of a load-balancer is created in the NVE, an embodiment also creates one or more entries in load-balancer instance table 700. Table 700 is populated with the forwarding information of the real servers managed by the load-balancer instance.

For example, suppose that two instances of a load-balancer—load-balancer ID 1 and 2—are created in the NVE, as indicated in column 702. Column 704 informs whether a load-balancer instance is operational, i.e., ready for use (valid=True), or not (valid=False). Column 706 provides the VIP address of each load-balancer instance.

As shown, there are three entries in table 700 for load-balancer 1 with VIP 120.1.1.2 and two entries for load-balancer 2 with VIP 120.1.2.2. column 708 provides the next hop information from the load-balancer instance to one of the real servers managed by the load-balancer instance. For example, each of the three entries for load-balancer ID 1 has in column 708 a next hop information to a particular and distinct real server.

When an embodiment adds/deletes a load-balancer instance, and/or add/deletes a real server to a load-balancer instance, table 700 is updated according to the description of columns 702-708. When the NVE receives a packet from a client, the embodiment first looks up the NVE forwarding table—i.e., table 600 in FIG. 6. If the look up result is a load-balancer entry, the embodiment next looks up load-balancer instance table 700 by the load-balancer ID. The lookup in table 700 provides one or more next hop information depending on the number of entries associated with the load-balancer ID. The load-balancing algorithm selects one of the entries, resulting in a singular next hop information.

When a load-balancer instance has been running for a period, and all packets of a client are being resolved by the load-balancer instance, the load-balancer instance is said to be in Normal mode, which is indicated in column 604 in table 600 in FIG. 6. It may be the case that a session has already been sending packets and receiving replies from a particular real server when a new load-balancer is instantiated, an old load-balancer instance is to be deleted, a new real server is added to a pool of a load-balancer instance, or an existing real server is to be deleted from the pool of a load-balancer instance. It is normally, but not necessarily, desirable that the affinity of a client or a session to a particular real server be maintained as long as possible.

With reference to FIG. 8, this figure depicts a session table in accordance with an illustrative embodiment. Session table

800 can be created by an embodiment, such as by application 302 in FIG. 3, in the NVE where the embodiment instantiates the load-balancer.

Recall that in one example embodiment, a portion of the packet was hashed to determine a real server that should process the packet. The example is reused here only for the clarity of the description and without implying any limitation on the method of choosing a real server.

In order to ensure the consistency of the previous chosen real server for a certain packet after the adding/removing of a real server to a pool, the original hash scheme is by use of session table 800. Session table 800 is populated at a PRE stage as indicated in column 604 in table 600 in FIG. 6. Particularly, the PRE stage is entered when any one or more of the following operations are occurring or about to occur while an affinity between a session or client and a real server has already been established—(i) a load-balancer instance is added to the NVE, (ii) an existing load-balancer instance is about to be deleted from the NVE, (iii) a real server is added to the pool of a load-balancer instance, and (iv) a real server is to be removed from the pool of a load-balancer instance.

An entry in table 800 informs whether a packet from a source address—e.g., IP address and port number—when received with the VIP of a load-balancer instance as a destination address has a valid remaining age for an affinity and if so, the next hop information for the real server with which the affinity exists. As a non-limiting example, a valid remaining age is indicated by a value False in column 802 to indicate that the load-balancer cannot yet decide which real server to use for the packet. An expiry, or no remaining valid age, of the affinity is indicated by a value True in column 802 to indicate that the load-balancer can decide which real server to use for the packet. The operation of table 800 is understood in conjunction with the description of FIG. 9.

Figure 9:
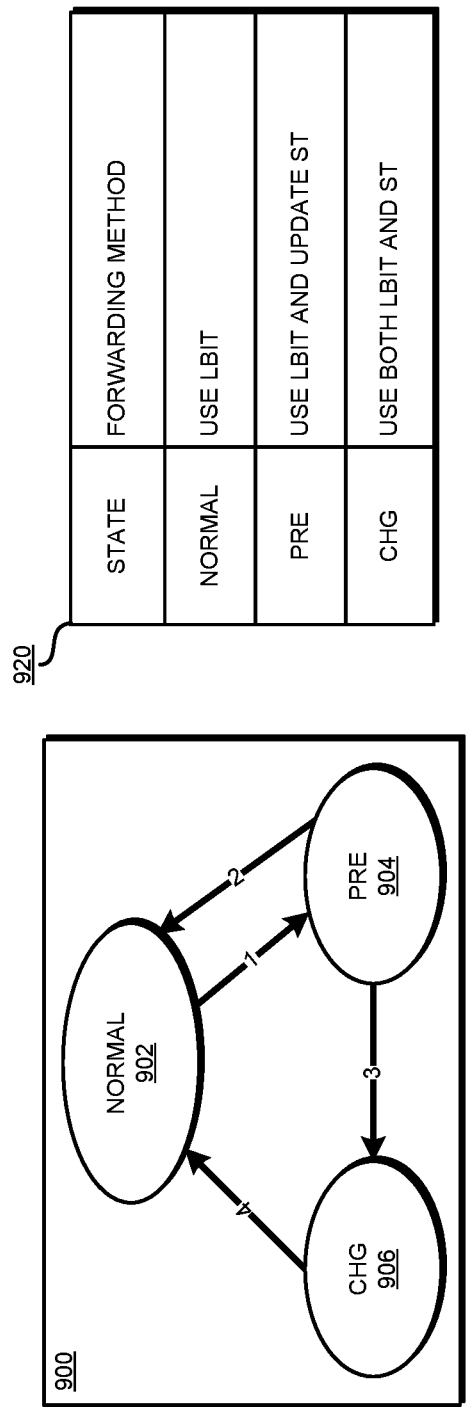
FIG. 9 depicts a state transition diagram of the state changes during modifications of the load-balancer instance or real servers in accordance with an illustrative embodiment.

With reference to FIG. 9, this figure depicts a state transition diagram of the state changes during modifications of the load-balancer instance or real servers in accordance with an illustrative embodiment. States 902, 904, and 906 in state diagram 900 correspond to the states identified in column 604 in table 600 in FIG. 6. According to table 920, in state NORMAL, the NVE forwarding table 600 is used in conjunction with load-balancer instance table 700 for routing packets. In state PRE, the modified NVE forwarding table 600 is used in conjunction with load-balancer instance table 700, and session able 800 is updated for aging of an entry therein. In state CHG, the NVE forwarding table 600 is used in conjunction with load-balancer instance table 700 and session able 800. These usages are further described as follows—

According to state diagram 900, state transition 1 from NORMAL to PRE occurs when an entry is added, deleted, or otherwise updated in load-balancer instance table 700. State transition 2 from PRE to NORMAL occurs when the entry addition, deletion, or update in load-balancer instance table 700 is either withdrawn for some reason or a timer associated with the adding/deleting/update expires while session table 800 remains empty with no affinity entries of any remaining validity age being present therein.

State transition 3 from PRE to CHG occurs when the entry addition, deletion, or update in load-balancer instance table 700 has been made, a timer associated with the adding/deleting/update expires, and session table 800 is not empty with at least one affinity entry of a remaining validity age being present therein. State transition 4 from CHG to NORMAL occurs when every entry in session table 800 has aged by more than a valid age.

At each transition, the value in column 604 of modified NVE forwarding table 600 is updated. At state transition 4, the Boolean value in column 704 in load-balancer instance table entry 700 is also updated. The aging of an entry can be based on a timer, packet count, or other configurable event in a given implementation. If the age is False (remaining validity) in column 802 in an entry in session table 800, the next hop from that entry is used to forward the packet. If the age is True (aged past validity) in column 802 in an entry in session table 800, the next hop to forward the packet can be decided by the load-balancer instance.

The process of addition as well as deletion follow similar logic in using tables 600, 700, and 800, and state diagram 900. When a real server is added, an embodiment adds the real server's information to LOAD-BALANCER instance table 700. But during the data forwarding process, the embodiment causes the NVE to first look up session table 800, and if affinity of valid age can be found for the packet in session table 800, then the real server with affinity is used directly, otherwise, load-balancer instance table 700 is used to do the hash-based lookup and selection.

At the same time, an aging scheme is used on the entries in session able 800. When no more packets match with an entry in session table 800 for a certain period, the session able entry is regarded as out-of-date (age=TRUE) and deleted from session table 800. When all entries in session table 800 have aged, session table 800 can be deleted.

The process of deletion of real servers is similar to that of the adding of application servers in that the deletion process can also be divided into two phases—PRE real server deletion, and then deletion to resume NORMAL state after deletion. Session table 800 or entries therein can be similarly generated and aged to ensure that the hash value of packets having affinity to the real server being deleted can map to that server for a configurable valid age.

The affinity is maintained as long as validity of the remaining age of the affinity exists. When no affinity to a real server remains according to session table 800, the real server can be deleted and the future packets can be migrated to remaining real servers. When traffic has been migrated away from all real servers of the pool of a load-balancer instance, the load-balancer instance can be deleted.

Figure 10:
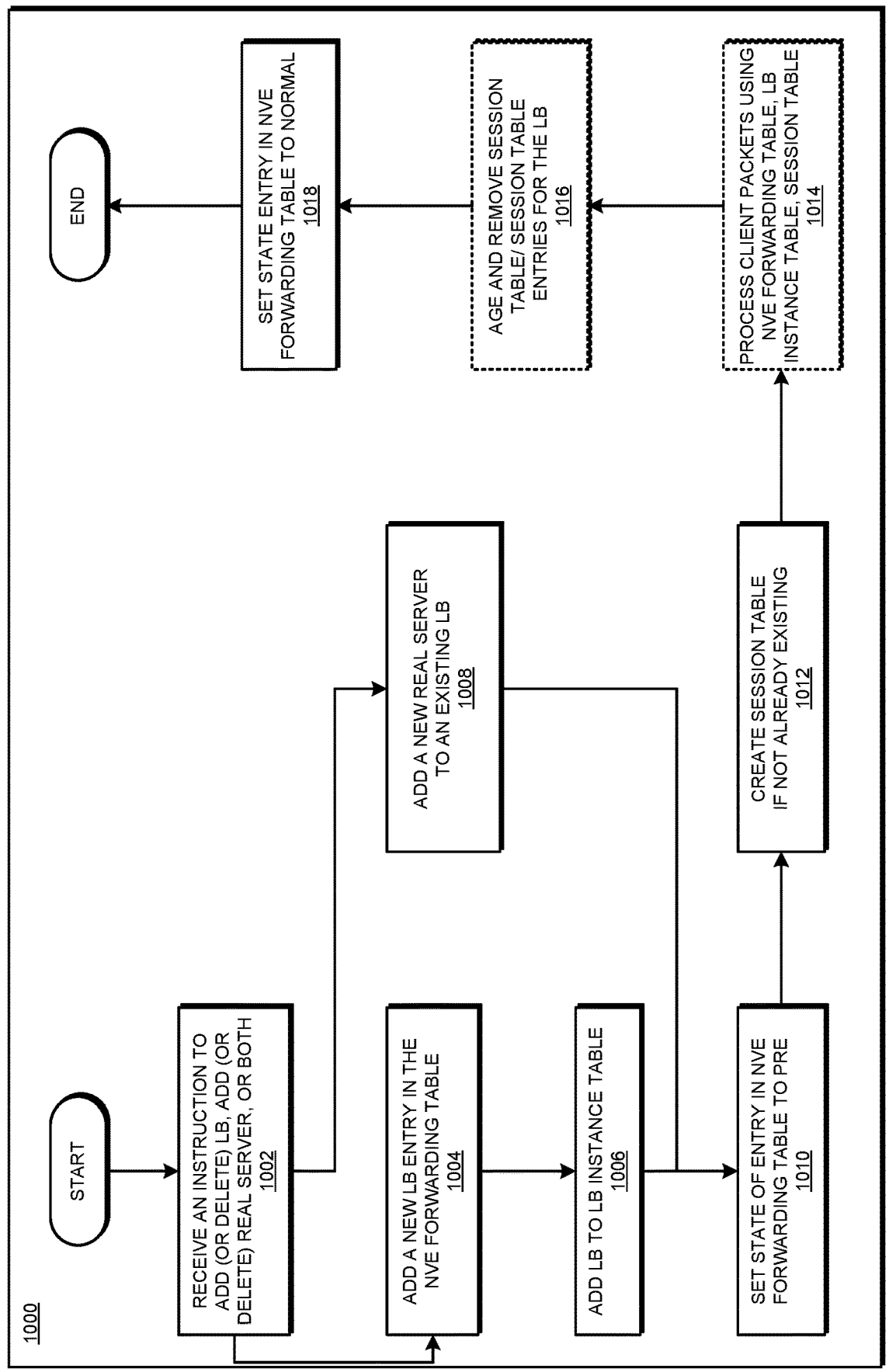
FIG. 10 depicts a flowchart of an example process for distributed load-balancing for an SDN in accordance with an illustrative embodiment.

With reference to FIG. 10, this figure depicts a flowchart of an example process for distributed load-balancing for an SDN in accordance with an illustrative embodiment. Process 1000 can be implemented in application 302 in FIG. 3. Process 1000 has been depicted and described with respect to an addition operation only as an example, and can be adapted for use with a deletion operation as well, as described herein.

The application receives an instruction, such as an invocation of an API of a modified SDN controller, to (i) add (or delete) a load-balancer instance, (ii) add (or delete) a real server to/from a load-balancer, or (iii) add (or delete) a load-balancer instance and a real server (block 1002). When adding a load-balancer instance, the application adds a load-balancer entry in the NVE forwarding table (block 1004). The application also adds the load-balancer to the load-balancer instance table (block 1006). When adding a real server to a load-balancer instance, the application adds a new real server entry to the load-balancer instance table (1008).

The application sets the state of the entry in the NVE forwarding table to PRE (block 1010). The application creates a session table if not already existing, and adds an entry therein for each known affinity (block 1012). The application then processes the client packets using the modified NVE forwarding table, the load-balancer instance table, and the session table (block 1014). The application ages and removes the session table entries that are restricting the load-balancer selection of real servers (block 1016). When all such entries have been fully aged in the session table, the application sets the state in the modified NVE forwarding table to NORMAL (block 1018). The application ends process 1000 thereafter, allowing normal load-balancing operations to occur and continue in the NVE.

Thus, a computer implemented method, system or apparatus, and computer program product are provided in the illustrative embodiments for distributed load-balancing for an SDN and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in 1he flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    modifying a forwarding table in a network virtualization edge (NVE) in a software defined network (SDN), to indicate that a next hop for a packet having a destination address of a load-balancer instance is to be resolved by the load-balancer instance, the modified forwarding table including a first entry indicating that the destination address is a virtual address of the load-balancer instance and a second entry including a load balancer state identifier associated with the load-balancer instance, the load balancer state identifier further associated with one or more entries of a load-balancer instance table, the load balancer state identifier identifying one of three possible states of the load-balancer instance, wherein the three possible states comprise a normal state, a pre state, and a chg state, a state of the load-balancer instance identified by the load balancer state identifier changeable from one of the three possible states to another of the three possible states when an entry in the load-balancer instance table is updated, when a valid affinity between the packet and a second real server exists according to an entry in a session table, and when an age of the affinity exceeds the age threshold;
    forwarding, using the modified forwarding table, the packet through an underlay of the SDN such that the packet tunnels from the NVE to a second NVE, the second NVE hosting a first real server managed by the load-balancer instance.
2. The method of claim 1, further comprising:
    determining whether a valid affinity between the packet and a second real server exists according to an entry in a session table; and
    replacing the first real server with the second real server in the forwarding such that the forwarding actually forwards the packet to a third NVE that hosts the second real server.
3. The method of claim 2, further comprising:
    adding a session entry in the session table, the session entry being indicative of an existing affinity between a session and the second real server, the packet being from the session;
    setting an age threshold for the session entry, wherein no packets received from the session within the age threshold causes the age of the session entry to age to exceed the age threshold, and wherein the affinity is valid when an age of the affinity has not exceeded the age threshold.
4. The method of claim 1, wherein the forwarding avoids the packet reaching an intermediate NVE in the SDN.
5. The method of claim 1, further comprising:
    hashing the portion of the packet, as a part of determining the value; and
    selecting an entry from a plurality of entries in the load-balancer instance table, the entry providing a singular next hop to the first real server, and each entry in the plurality of entries in the load-balancer instance table corresponding to a distinct real server in a pool of real servers managed by the load-balancer instance.
6. The method of claim 1, wherein the NVE forwarding table includes a next hop address for a second destination address contained in a second packet.
7. The method of claim 1, further comprising:
    associating with the load-balancer instance the virtual address, the virtual address being a valid destination address only within the NVE, and the virtual address being usable by a virtual machine coupled with the NVE.
8. The method of claim 1, further comprising:
    constructing an application programming interface (API) in a controller of the SDN, the API causing an instantiation of the load-balancer instance in the NVE.
9. The method of claim 1, further comprising:
    constructing an application programming interface (API) in a controller of the SDN, the API causing a deletion of the load-balancer instance in the NVE.
10. The method of claim 1, further comprising:
    constructing an application programming interface (API) in a controller of the SDN, the API causing an addition of a real server to a load-balanced pool of the load-balancer instance in the NVE.
11. The method of claim 1, further comprising:
    constructing an application programming interface (API) in a controller of the SDN, the API causing a removal of a real server from a load-balanced pool of the load-balancer instance in the NVE.
12. A computer usable program product comprising one or more computer-readable storage devices, and program instructions stored on at least one of the one or more storage devices, the stored program instructions comprising:
    program instructions to modify a forwarding table in a network virtualization edge (NVE) in a software defined network (SDN), to indicate that a next hop for a packet having a destination address of a load-balancer instance is to be resolved by the load-balancer instance, the modified forwarding table including a first entry indicating that the destination address is a virtual address of the load-balancer instance and a second entry including a load balancer state identifier associated with the load-balancer instance, the load balancer state identifier further associated with one or more entries of a load-balancer instance table, the load balancer state identifier identifying one of three possible states of the load-balancer instance, wherein the three possible states comprise a normal state, a pre state, and a chg state, a state of the load-balancer instance identified by the load balancer state identifier changeable from one of the three possible states to another of the three possible states when an entry in the load-balancer instance table is updated, when a valid affinity between the packet and a second real server exists according to an entry in a session table, and when an age of the affinity exceeds the age threshold;

program instructions to forward, using the modified forwarding table, the packet through an underlay of the SDN such that the packet tunnels from the NVE to a second NVE, the second NVE hosting a first real server managed by the load-balancer instance.

13. The computer usable program product of claim 12, further comprising:

program instructions to determine whether a valid affinity between the packet and a second real server exists according to an entry in a session table; and program instructions to replace the first real server with the second real server in the forwarding such that the forwarding actually forwards the packet to a third NVE that hosts the second real server.

14. The computer usable program product of claim 13, further comprising:

program instructions to add a session entry in the session table, the session entry being indicative of an existing affinity between a session and the second real server, the packet being from the session;

program instructions to set an age threshold for the session entry, wherein no packets received from the session within the age threshold causes the age of the session entry to age to exceed the age threshold, and wherein the affinity is valid when an age of the affinity has not exceeded the age threshold.

15. The computer usable program product of claim 12, wherein the program instructions to forward avoids the packet reaching an intermediate NVE in the SDN.

16. The computer usable program product of claim 12, further comprising:

program instructions to hash the portion of the packet, as a part of determining the value; and program instructions to select an entry from a plurality of entries in the load-balancer instance table, the entry providing a singular next hop to the first real server, and each entry in the plurality of entries in the load-balancer instance table corresponding to a distinct real server in a pool of real servers managed by the load-balancer instance.

17. The computer usable program product of claim 12, wherein the NVE forwarding table includes a next hop address for a second destination address contained in a second packet.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to modify a forwarding table in a network virtualization edge (NVE) in a software defined network (SDN), to indicate that a next hop for a packet having a destination address of a load-balancer instance is to be resolved by the load-balancer instance, the modified forwarding table including a first entry indicating that the destination address is a virtual address of the load-balancer instance and a second entry including a load balancer state identifier associated with the load-balancer instance, the load balancer state identifier further associated with one or more entries of a load-balancer instance table, the load balancer state identifier identifying one of three possible states of the load-balancer instance, wherein the three possible states comprise a normal state, a pre state, and a chg state, a state of the load-balancer instance identified by the load balancer state identifier changeable from one of the three possible states to another of the three possible states when an entry in the load-balancer instance table is updated, when a valid affinity between the packet and a second real server exists according to an entry in a session table, and when an age of the affinity exceeds the age threshold;

program instructions to forward, using the modified forwarding table, the packet through an underlay of the SDN such that the packet tunnels from the NVE to a second NVE, the second NVE hosting a first real server managed by the load-balancer instance.

* * * * *